United States Patent
Magny et al.

(10) Patent No.: US 12,552,895 B2
(45) Date of Patent: Feb. 17, 2026

(54) CONTINUOUS PREPARATION OF POLYURETHANES OR POLYUREAS

(71) Applicant: COATEX, Genay (FR)

(72) Inventors: Benoit Magny, Cailloux sur Fontaines (FR); Yves Matter, Reyrieux (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 828 days.

(21) Appl. No.: 17/277,471

(22) PCT Filed: Oct. 15, 2019

(86) PCT No.: PCT/FR2019/000174
§ 371 (c)(1),
(2) Date: Mar. 18, 2021

(87) PCT Pub. No.: WO2020/084200
PCT Pub. Date: Apr. 30, 2020

(65) Prior Publication Data
US 2021/0269580 A1 Sep. 2, 2021

(30) Foreign Application Priority Data
Oct. 26, 2018 (FR) ...................................... 1859946

(51) Int. Cl.
| | | |
|---|---|---|
| *C08G 18/73* | (2006.01) |
| *C08G 18/08* | (2006.01) |
| *C08G 18/24* | (2006.01) |
| *C08G 18/28* | (2006.01) |
| *C08G 18/48* | (2006.01) |
| *C08G 18/67* | (2006.01) |
| *C08G 18/75* | (2006.01) |
| *C08G 18/76* | (2006.01) |
| *C08L 75/02* | (2006.01) |
| *C08L 75/04* | (2006.01) |
| *C08L 75/08* | (2006.01) |

(52) U.S. Cl.
CPC ......... *C08G 18/73* (2013.01); *C08G 18/0895* (2013.01); *C08G 18/246* (2013.01); *C08G 18/2835* (2013.01); *C08G 18/4833* (2013.01); *C08G 18/6715* (2013.01); *C08G 18/755* (2013.01); *C08G 18/7621* (2013.01); *C08L 75/02* (2013.01); *C08L 75/08* (2013.01)

(58) Field of Classification Search
None
See application file for complete search history.

(56) References Cited

U.S. PATENT DOCUMENTS

| | | | |
|---|---|---|---|
| 4,079,028 A * | 3/1978 | Emmons | A61K 47/34 528/68 |
| 5,973,063 A | 10/1999 | Doolan et al. | |
| 2011/0060101 A1 * | 3/2011 | Suau | C08G 18/2835 528/65 |
| 2011/0313053 A1 | 12/2011 | Muenzenberg et al. | |
| 2012/0101223 A1 | 4/2012 | Rabasco et al. | |
| 2014/0011967 A1 | 1/2014 | Rabasco et al. | |
| 2017/0130072 A1 * | 5/2017 | McCulloch | C09D 171/02 |
| 2017/0327621 A1 * | 11/2017 | Mertoglu | A01N 47/02 |

FOREIGN PATENT DOCUMENTS

| | | |
|---|---|---|
| EP | 0 905 157 A1 | 3/1999 |
| EP | 2 444 432 A1 | 4/2012 |
| JP | 2002069430 A * | 3/2002 |
| JP | 2012144658 A * | 8/2012 |
| WO | WO 2011/030197 A2 | 3/2011 |

OTHER PUBLICATIONS

International Search Report issued Feb. 5, 2020 in PCT/FR2019/000174 filed Oct. 15, 2019, 2 pages.

* cited by examiner

*Primary Examiner* — Ha S Nguyen
(74) *Attorney, Agent, or Firm* — Oblon, McClelland, Maier & Neustadt, L.L.P.

(57) ABSTRACT

Associative thickeners, and more particularly to associative thickeners of the HEUR type, may be used in aqueous formulations. In particular, a method for continuous preparation of HEUR-type associative thickeners may include reactive extrusion. These products are suitable to be used in aqueous formulations. Such a method may include: continuously preparing a hydrophilic polymer (P) by a reactive extrusion of precursors including a water-soluble polyalkylene glycol (A) and a product (B); and mixing the hydrophilic polymer (P) in a medium including a solvent. The water-soluble polyalkylene glycol (A) may include a polyethylene glycol, a polyethylene glycol-polypropylene glycol copolymer with at most 40% by weight of polypropylene glycol, and/or a polyethylene glycol-polybutylene glycol copolymer comprising at most 20% by weight of polybutylene glycol. The product (B) may include an associative group and an isocyanate group.

20 Claims, No Drawings

CONTINUOUS PREPARATION OF POLYURETHANES OR POLYUREAS

CROSS-REFERENCE TO RELATED APPLICATIONS

The present application is the national stage of international application PCT/FR2019/000174, filed on Oct. 15, 2019, and claims the benefit of the filing date of French Appl. No. 1859946, filed on Oct. 26, 2018.

DESCRIPTION

The invention relates to the field of associative thickeners, and more particularly HEUR-type associative thickeners, used in water-based formulations. The invention particularly relates to a method for continuously preparing HEUR-type associative thickeners by reactive extrusion. These products are intended for use in water-based formulations.

Thickeners include associative thickeners, which are typically water-soluble polymers comprising insoluble hydrophobic groups. Such macromolecules have an associative character: when introduced in water, hydrophobic groups are able to assemble in the form of micellar aggregates. These aggregates are connected to each other by the hydrophilic parts of the polymers. A three-dimensional network then forms which causes the viscosity of the medium to increase.

These associative thickeners include the class of HEUR type associative thickeners. They denote copolymers resulting from the synthesis between a compound of polyalkylene glycol type, a polyisocyanate, and an associative monomer of alkyl or aryl or aryalkyl type comprising a hydrophobic end group. These structures are known in particular to develop strong Brookfield viscosities at different shear gradients. HEUR-type thickeners include hydrophobically modified ethylene oxide urethane and hydrophobically modified ethylene oxide urea. There are also combinations of hydrophobically modified ethylene oxide urethane and hydrophobically modified ethylene oxide urea.

Among the compositions that also comprise a latex-type binder compound, the HEUR polymers generally make it possible to develop interactions with the particles of these binder compounds. Such interactions then generally make it possible to increase the thickening effect.

Compositions comprising a thickening polymer are usually prepared by prior synthesis of the thickening polymer by a discontinuous process, called batch processing.

Document EP 0 905 157 relates to thickening compositions used for controlling the viscosity of transparent water-based systems such as paints and enamel-based coatings for the automotive industry. Document WO 2011-030197 discloses associative thickening polyurethanes manufactured from polyalkylene glycol, from polyisocyanates and from optionally oxyethylenated cardanol. Document EP 2 361 939 relates to a thickening agent based on an aqueous preparation of non-ionic, water-dispersible or water-soluble polyurethanes. Document EP 2 444 432 discloses a composition comprising a hydrophobically modified alkylene oxide polyurethane with a molecular mass of from 50,000 to approximately 150,000 Daltons.

In the context of the invention, a method is sought for preparing a thickening composition, comprising a hydrophilic polymer, advantageously water-soluble, that is flexible and reproducible. The aim is also to improve the thickening efficacy of the thickening composition. The invention proposes to prepare the hydrophilic polymer continuously by reactive extrusion.

Preferably, the hydrophilic polymer is a water-soluble polymer. For the purposes of this invention, "water-soluble polymer" is understood to mean a polymer that is completely water-miscible, in all proportions, at a temperature above the melting point of this polymer.

The invention thus relates to a method for preparing a thickening composition comprising:
a. the continuous preparation of a hydrophilic polymer (P) by reactive extrusion,
  (A) of at least one water-soluble polyalkylene glycol (A) chosen among a polyethylene glycol, a polyethylene glycol-polypropylene glycol copolymer containing at most 40% by weight of polypropylene glycol, a polyethylene glycol-polybutylene glycol copolymer containing at most 20% by weight of polybutylene glycol and combinations thereof;
  (B) of at least one product (B) comprising at least one associative group and at least one isocyanate group, chosen among:
    a compound (B1) of formula (I):

R—N=C=O    (I)

wherein R represents a straight, branched, or cyclic, saturated, unsaturated, or aromatic hydrocarbon group comprising from 6 to 40 carbon atoms,
    a combination of a diisocyanate (B3) and of a compound (B2) of formula (II):

R'-(EO)$_n$—(PO)$m$—(BO)$_p$—X    (II)

wherein:
      R' represents a straight, branched, or cyclic, saturated, unsaturated, or aromatic hydrocarbon group comprising from 6 to 40 carbon atoms,
      (EO) represents an ethoxylene group,
      (PO) represents a propoxylene group,
      (BO) represents a butoxylene group,
      n represents a real number comprised between 0 and 150,
      m represents a real number comprised between 0 and 150,
      p represents a real number comprised between 0 and 150,
      the sum of n+m+p represents a real number comprised between 0 and 150,
      X represents a chemical group carrying a labile hydrogen that can react with an isocyanate group,
    the product resulting from the prior condensation of a diisocyanate (B3) and of a compound (B2) of formula (II),
    a combination of a diisocyanate (B3) and of a compound (B1) of formula (I),
    and combinations thereof;
b. mixing the hydrophilic polymer (P) in at least one solvent.

Thus, according to the invention, a hydrophilic polymer (P) is prepared by reaction of compounds (A), (B) and optionally of a cross-linking compound (C), according to a continuous reactive extrusion method.

Compound (A)

Compound (A) is a water-soluble polyalkylene glycol.

The polyalkylene glycol is chosen among a polyethylene glycol, a polyethylene glycol-polypropylene glycol copolymer containing at most 40% by weight of polypropylene glycol, a polyethylene glycol-polybutylene glycol copolymer containing at most 20% by weight of polybutylene glycol and combinations thereof.

The percentages of polypropylene glycol are expressed by weight relative to the total weight of the polyethylene glycol-polypropylene glycol copolymer. Likewise, the percentages of polybutylene glycol are expressed by weight relative to the total weight of the polyethylene glycol-polybutylene glycol copolymer.

In order for the polyethylene glycol-polypropylene glycol copolymer to retain its water-soluble nature, its polypropylene glycol content is less than 40% by weight, advantageously less than 35% by weight.

In order for the polyethylene glycol-polybutylene glycol copolymer to retain its water-soluble nature, its polybutylene glycol content is less than 20% by weight, advantageously less than 15% by weight.

Compound (A) is advantageously a polyalkylene glycol with a weight-average molecular mass (Mw) ranging from 1,000 to 40,000 g/mol, preferably from 3,000 to 20,000 g/mol, more preferentially from 4,000 to 15,000 g/mol.

According to the invention, the polylakylene glycol is preferentially polyethylene glycol, preferentially a polyethylene glycol with a weight-average molecular mass (Mw) comprised between 2,000 g/mol and 20,000 g/mol, preferentially between 8,000 g/mol and 15,000 g/mol.

According to the invention, the molecular mass of compound (A) is calculated from the hydroxyl index determined in accordance with standard DIN 53240-1, now standard DIN EN ISO 4629-1, of December 2016, by applying the formula: (56,100×functionality in OH groups)/hydroxyl index.

Product (B)

According to the invention, the product (B) is a compound or a combination of compounds that makes it possible to provide both an isocyanate group and an associative group.

Thus, the expression "product comprising an associative group and at least one isocyanate group" describes a compound or a combination of compounds that makes it possible to provide at least one isocyanate group and an associative group. Indeed, the same compound can carry both an isocyanate group and an associative group. However, it is also possible to foresee a combination of several compounds with at least one compound carrying at least one isocyanate group and at least one other compound carrying an associative group.

"Associative group" denotes in particular, within the meaning of this invention, a group of formula R or R' according to the invention.

According to the invention, the product (B) is chosen among:
a compound (B1) of formula (I),
a combination of a compound (B2) of formula (II) and of a diisocyanate (B3),
the product resulting from the prior condensation of a diisocyanate (B3) and of a compound (B2) of formula (II),
a combination of a compound (B1) of formula (I) and a diisocyanate (B3),
and combinations thereof.

According to the invention, compound (B1) is a compound of formula (I):

$$R-N=C=O \quad (I)$$

wherein R represents a straight, branched, or cyclic, saturated, unsaturated, or aromatic hydrocarbon group comprising from 6 to 40 carbon atoms, preferentially from 6 to 32 carbon atoms.

According to the invention, the hydrocarbon group R advantageously represents a linear, branched or cyclic, advantageously straight or branched, alkyl or alkenyl group comprising from 6 to 40 carbon atoms, preferentially from 6 to 32 carbon atoms.

According to the invention, the hydrocarbon group R can also represent an aromatic group comprising from 6 to 40 carbon atoms, preferentially from 6 to 32 carbon atoms.

Also more preferably according to the invention, the compound of formula (I) is a compound chosen among:
the aromatic monoisocyanate compounds, in particular phenyl isocyanate, diphenylmethane monoisocyanate, 2-phenylethyl isocyanate, 4-tolyl isocyanate, 2-tolyl isocyanate, 2,5-dimethylphenyl isocyanate, 3,4-dimethylphenyl isocyanate, 2,3-dimethylphenyl isocyanate, 4-isocyanato-4'-methyldiphenylmethane;
the polyfunctional aromatic monoisocyanate compounds, in particular 2-methoxy-4-nitrophenyl isocyanate, polymethylene polyphenyl isocyanate;
the alkyl monoisocyanate compounds, in particular hexyl isocyanate, heptyl isocyanate, octyl isocyanate, n-nonyl isocyanate, decyl isocyanate, undecyl isocyanate, dodecyl isocyanate, tridecyl isocyanate, tetradecyl isocyanate, cetyl isocyanate, 2-ethylhexyl isocyanate, n-octyl isocyanate, isononyl isocyanate, stearyl isocyanate, behenyl isocyanate, eicosanyl isocyanate, lignoceryl isocyanate;
the cycloalkyl monoisocyanate compounds, in particular cyclohexyl isocyanate, 1-isocyanatomethyl-1,3,3-trimethylcyclohexane.

According to the invention, compound (B2) is a compound of formula (II):

$$R'-(EO)_n-(PO)_m-(BO)_p-X \quad (II)$$

wherein:
R' represents straight, branched, or cyclic, saturated, unsaturated, or aromatic hydrocarbon group comprising from 6 to 40 carbon atoms, preferentially from 6 to 32 carbon atoms,
(EO) represents an ethoxylene group,
(PO) represents a propoxylene group,
(BO) represents a butoxylene group,
n represents a real number comprised between 0 and 150,
m represents a real number comprised between 0 and 150,
p represents a real number comprised between 0 and 150,
the sum of n+m+p represents a real number comprised between 0 and 150,
X represents a chemical group carrying a labile hydrogen that can react with an isocyanate group.

According to the invention, the hydrocarbon group R' advantageously represents a linear, branched or cyclic, advantageously straight or branched, alkyl or alkenyl group comprising from 6 to 40 carbon atoms, preferentially from 6 to 32 carbon atoms.

According to the invention, the hydrocarbon group R' can also represent an aromatic group comprising from 6 to 40 carbon atoms, preferentially from 6 to 32 carbon atoms. According to the invention, the hydrocarbon group R' can represent a radical of formula (III):

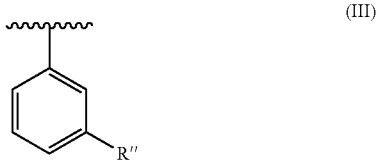

(III)

wherein R" represents a hydrocarbon group of formula $C_{15}H_{31-x}$ where x=0, 2, 4, 6; thus possibly comprising 0, 1, 2 or 3 ethylenic unsaturations (double bond). Such a radical of formula (III) is advantageously derived from cardanol, and is therefore of bio-sourced and non-polluting origin.

According to the invention, the hydrocarbon group R' can also represent a tristyrylphenyl group (TSP) of formula:

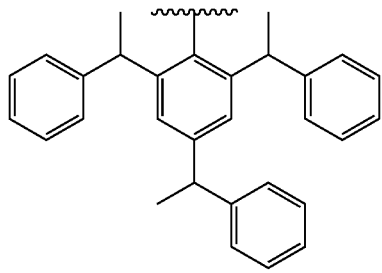 [SMILES: *c1c(C(C)c2ccccc2)cc(C(C)c2ccccc2)cc1C(C)c1ccccc1]

or a distyrylphenyl group (DSP) of formula:

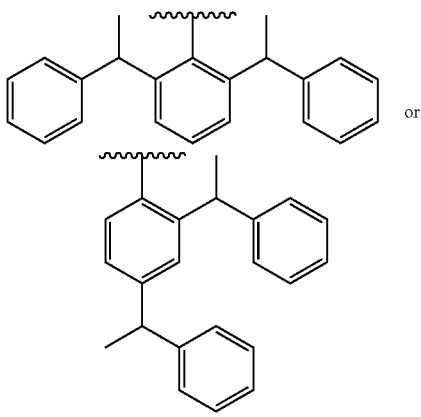

or

According to the invention, the sum n+m+p varies from 0 to 150, advantageously from 1 to 150, more advantageously from 1 to 100. Preferably p is 0. According to the invention, advantageously n≥m, in particular m is 0.

According to the invention, the sum n+m+p advantageously varies from 1 to 15, more advantageously from 8 to 12. Preferably p is 0. According to the invention, advantageously n≥m, in particular m is 0.

According to the invention, the sum n+m+p advantageously varies from 1 to 8, more advantageously from 2 to 6. Preferably p is 0. According to the invention, advantageously n≥m, in particular m is 0.

According to the invention, the sum n+m+p advantageously varies from 15 to 40, more advantageously from 15 to 30, even more advantageously from 20 to 30. Preferably p is 0. According to the invention, advantageously n≥m, in particular m is 0.

According to the invention, the sum n+m+p advantageously varies from 40 to 80, more advantageously from 50 to 70. Preferably p is 0. According to the invention, advantageously n≥m, in particular m is 0.

According to the invention, X advantageously represents a group chosen among an alcohol group or an amine group. The amine group can be a primary amine group. Preferably, X represents an alcohol group.

According to the invention, compound (B3) is a diisocyanate.

Examples of diisocyanate (B3) include 1,4-butane diisocyanate, hexamethylene diisocyanate, pentamethylene diisocyanate, isophorone diisocyanate, 1,3- and 1,4-cyclohexane diisocyanate, methylene bis(4-cyclohexylisocyanate), 2,6-toluene diisocyanate, 2,4-toluene diisocyanate, 2,2'-diphenylmethylene diisocyanate, 4,4'-diphenylmethylene diisocyanate, 2,4'-diphenylmethylene diisocyanate, 4,4'-dibenzyl diisocyanate, 2,4'-dibenzyl diisocyanate, m-xylylene diisocyanate, 1-methyl-2,4-diisocyanatocyclohexane and its combination with 1-methyl-2,6-diisocyanatocyclohexane, tetramethylxylene diisocyanate (TMXDI), hexane trimethyl-1,6-diisocyanate and combinations thereof.

Cross-Linking Compound (C)

The reaction can also be carried out in the presence of a cross-linking agent. The cross-linking agent is advantageously chosen among a polyisocyanate comprising more than 2 isocyanate groups, a polyol, a polyamine and combinations thereof.

According to the invention, the cross-linking polyisocyanate (C) is an isocyanate compound comprising more than 2 isocyanate groups, for example comprising up to 3, up to 4, up to 5 or up to 6 isocyanate groups.

According to the invention, the cross-linking polyisocyanate (C) is advantageously chosen among isocyanate compounds comprising more than 2.5 isocyanate groups, preferably more than 2.6 isocyanate groups, more preferentially more than 2.7 isocyanate groups, even more preferentially 3 or more than 3 isocyanate groups.

Examples of cross-linking polyisocyanates (C) include:
polymeric diphenylmethylene diisocyanate (PMDI), polymeric toluene diisocyanate (PTDI);
triphenylmethane-4,4',4"-triisocyanate (4-isocyanatobenzene); or or 1,1',1"-methylidynetris
an isocyanurate compound, in particular an isocyanurate compound of a compound chosen among:
the symmetrical aromatic diisocyanate compounds, preferably:
2,2'-diphenylmethylene diisocyanate (2,2'-MDI) and 4,4'-diphenylmethylene diisocyanate (4,4'-MDI);
4,4'-dibenzyl diisocyanate (4,4'-DBDI);
2,6-toluene diisocyanate (2,6-TDI);
m-xylylene diisocyanate (m-XDI);
tetramethylxylene diisocyanate (TMXDI);
the symmetrical alicyclic diisocyanate compounds, preferably methylene bis(4-cyclohexylisocyanate) ($H_{12}$MDI);
the symmetrical aliphatic diisocyanate compounds, preferably hexamethylene diisocyanate (HDI), pentamethylene diisocyanate (PDI);
the asymmetric aliphatic diisocyanate compounds, preferably trimethyl-1,6-hexane diisocyanate;
the asymmetric alicyclic diisocyanate compounds, preferably isophorone diisocyanate (IPDI);

the asymmetric aromatic diisocyanate compounds, preferably:
2,4'-diphenylmethylene diisocyanate (2,4'-MDI);
2,4'-dibenzyl diisocyanate (2,4'-DBDI);
2,4-toluene diisocyanate (2,4-TDI);
a biuret, in particular a biuret of a compound chosen among:
the symmetrical aromatic diisocyanate compounds, preferably:
2,2'-diphenylmethylene diisocyanate (2,2'-MDI) and 4,4'-diphenylmethylene diisocyanate (4,4'-MDI);
4,4'-dibenzyl diisocyanate (4,4'-DBDI);
2,6-toluene diisocyanate (2,6-TDI);
m-xylylene diisocyanate (m-XDI);
tetramethylxylene diisocyanate (TMXDI);
the symmetrical alicyclic diisocyanate compounds, preferably methylene bis(4-cyclohexylisocyanate) (H12MDI);
the symmetrical aliphatic diisocyanate compounds, preferably hexamethylene diisocyanate (HDI), pentamethylene diisocyanate (PDI);
the asymmetric aromatic diisocyanate compounds, preferably:
2,4'-diphenylmethylene diisocyanate (2,4'-MDI);
2,4'-dibenzyl diisocyanate (2,4'-DBDI);
2,4-toluene diisocyanate (2,4-TDI);
the asymmetric alicyclic diisocyanate compounds, preferably isophorone diisocyanate (IPDI);
and combinations thereof.

Other examples of cross-linking compounds (C) include polyfunctional compounds resulting from the condensation or addition of diisocyanates such as, for example, polymeric MDIs (PAPIs) or polymeric TDIs.

Other examples of cross-linking compounds (C) include:
molecules comprising more than two alcohol groups, optionally pre-oxyethylated, such as oses comprising from 4 to 8 carbon atoms and ose oligomers comprising from 1 to 10 ose units;
pentaerhytritol;
glycerol;
triethanolamine;
glycerol oligomers, in particular glycerol oligomers with 2 to 25 glycerol units;
molecules comprising more than two primary or secondary amine groups such as diethylenetriamine, triethyletramine and tetraethylenepentamine;
molecules comprising more than two different groups and reactive to isocyanates, particularly primary amines comprising an alcohol group, secondary amines comprising an alcohol group, in particular diethanolamine.

Catalyst

Preferably according to the invention, the reaction is carried out in the presence of a catalyst. This catalyst can be chosen among acetic acid, an amine, preferably 1.8-diazabicyclo[5.4.0]undec-7-ene (DBU), a derivative of a metal chosen among Al, Bi, Sn, Hg, Pb, Mn, Zn, Zr, Ti and mixtures thereof. Traces of water may also participate in the catalysis of the reaction. As examples of metal derivatives, a derivative is preferably chosen among dibutyl bismuth dilaurate, dibutyl bismuth diacetalate, dibutyl bismuth oxide, bismuth carboxylate, dibutyl tin dilaurate, dibutyl tin diacetate, dibutyl tin oxide, a mercury derivative, a lead derivative, zinc salts, manganese salts, a compound comprising chelated zirconium, a compound comprising chelated aluminium. The preferred metal derivative is chosen among a Bi derivative and an Sn derivative.

In the method according to the invention, in step a), the hydrophilic polymer (P) is advantageously prepared by reactive extrusion of (the percentages are expressed by weight relative to the total weight of the compounds introduced):
(A) at least 55% of water-soluble polyalkylene glycol (A);
(B) from 5 to 45% of product (B);
(C) from 0 to 10% of cross-linking compound (C).

According to the invention, the hydrophilic polymer (P) is advantageously prepared by reactive extrusion of at least 60%, more advantageously of at least 70%, even more advantageously of at least 80%, of water-soluble polyalkylene glycol (A) (the percentages are expressed by weight relative to the total weight of the compounds introduced).

According to the invention, the hydrophilic polymer P is advantageously prepared by reactive extrusion of from 5% to 40%, more advantageously of from 5% to 30%, even more advantageously of from 5% to 20%, of said product (B) (the percentages are expressed by weight relative to the total weight of the compounds introduced). According to the invention, the hydrophilic polymer (P) is advantageously prepared by reactive extrusion of from 0 to 8%, more advantageously of from 0 to 6%, of cross-linking compound (C) (the percentages are expressed by weight relative to the total weight of the compounds introduced).

The method according to the invention provides for the reaction of these components according to a continuous method by reactive extrusion.

Reactive extrusion is a method generally known in the preparation of thermoplastics, thus of polymers having high glass transition or melting temperatures, as the case may be, or for the preparation of high-viscosity polymers. Reactive extrusion makes it possible to carry out the all steps (mixing, polymerisation and purification/devolatilisation) in the same reactor, namely, the extruder.

Although polyalkylene glycol (A) is heat-sensitive, no degradation is generally observed.

Any type of extruder allowing components to be mixed can be used: single-screw extruders, two-stage extruders or co-kneaders, twin-screw extruders, planetary gearbox extruders, ring-type extruders. Twin-screw extruders are particularly suitable.

The L/D (length/diameter) ratio of the extruder is adapted according to the polymerisation or polycondensation, or even polyaddition, time, depending on the flow rate and residence time. The L/D ratio can, for example, be greater than or equal to 20, more advantageously greater than or equal to 30.

The usage parameters can be adapted, in particular the extruder screw rotation speed, the design of the extruder in the mixing areas, for example according to the desired blend. The extruder can comprise one or more feed areas. The components can be pre-mixed before introducing them into the extruder. It can also be foreseen to provide for an area in the extruder for melting certain compounds prior to adding the other compounds, in particular polyalkylene glycol (A) or compound (B2) of formula (II) before adding the diisocyanate (B3) or the compound (B1) of formula (I).

The extruder can comprise one or more heating areas. Advantageously, it comprises several heating areas. The polymerisation or the polycondensation or even the polyaddition reaction is advantageously carried out at a temperature ranging from 50° C. to 350° C., more advantageously ranging from 70° C. to 300° C. The pressure can vary from 50 mbar (5.103 Pa) to 5 bar (500.103 Pa). The polymerisation or the polycondensation reaction or even the polyaddition reaction is advantageously carried out in an inert atmosphere, for example produced by flushing with nitrogen or argon.

Before recovery of the polymer (P) at the extruder outlet, the method according to the invention may comprise one or more steps for evaporating the volatile components that have not reacted.

The method according to the invention makes it possible to obtain the polymer (P) with a satisfactory degree of conversion, in times that are in line with industrial use. In addition, the method according to the invention, compared to reactor batch processing, allows for faster homogenisation of the compounds with an increase in the diffusion rate of the compounds and thus improved mixing.

The method according to the invention also makes it possible to obtain polymers (P) with higher molecular masses (Mw) than those of polyurethane-type or polyurea-type polymers that can be obtained through batch processing in a reactor while the increase in viscosity imposes a maximum limit with regard to the molecular mass.

Reactive extrusion was found to be suitable for the preparation of the polymer (P) despite the sensitivity of polyalkylene glycol (A) to heat. It has been found that reactive extrusion makes it possible to save time, with shorter cycle times compared to reactor batch processing.

Surprisingly, the method according to the invention also makes it possible to improve the viscosifying properties of the thickening composition according to the invention. For the same amount of polymer (P) in the thickening composition, the thickening composition comprising a polymer (P) obtained by the method according to the invention will be thicker than the same thickening composition comprising a polymer obtained by reacting the same compounds, in the same proportions, but according to reactor batch processing.

Also, reactive extrusion makes it possible to work without solvent. Thus, in step a), preferably, no solvent is added. This is good for the environment and also an advantage in terms of the economic cost of the method since the costs of a solvent removal step are saved.

Also, a continuous reactive extrusion method is more flexible than reactor batch processing and makes it possible to vary the polymer ranges (P) during synthesis by varying the compounds introduced (type, quantity) into the feed areas. This is not the case for batch processing, in which the compounds and their contents are set for each reactor.

In addition, the method according to the invention is much more reproducible than batch processing in a reactor.

Depending on the nature of the product (B), the polymer (P) will be a polyurethane or a polyurea. The polymer (P) obtained by the method according to the invention is hydrophilic, advantageously water-soluble.

Preferably for the method according to the invention, the molecular mass (Mw) of the polymer (P) obtained may range up to 500,000 g/mol; advantageously, it may range from 10,000 to 500,000 g/mol, preferably from 60,000 to 500,000 g/mol.

The method according to the invention makes it possible to obtain polymers (P) with high molecular masses (Mw), advantageously ranging from 120,000 to 500,000 g/mol, preferably from 150,000 to 500,000 g/mol, preferably from 150,000 to 300,000 g/mol.

The method according to the invention also makes it possible to prepare polymers (P) with lower molecular mass (Mw), advantageously ranging from 10,000 to 150,000 g/mol, preferably from 60,000 to 150,000 g/mol, more preferentially from 60,000 to 120,000 g/mol.

According to the invention, the molecular mass of the polymer (P) is determined by Gel Permeation Chromatography (GPC). This technique uses a Waters liquid chromatography instrument equipped with a detector. This detector is a Waters 2414 refractive index detector. This liquid chromatography instrument is equipped with two size exclusion columns in order to separate the various molecular weights of the copolymers studied. The liquid elution phase is an organic phase comprised of THE (HPLC grade, not stabilised).

In a first step, about 25 mg of polyurethane is dissolved in 5 mL of THE, to which is added 0.1% by weight of water used as internal flow marker. Next, the solution is filtered through a 0.2 µm filter. 50 µL are then injected into the chromatography instrument (eluent: THF, HPLC grade, not stabilised).

The liquid chromatography instrument has an isocratic pump (Waters 515), the flow rate of which is set to 0.3 mL/min. The chromatography instrument also comprises an oven which itself comprises a system of columns in series: an Agilent PLgel MiniMIX-A column 250 mm long and 4.6 mm in diameter followed by an Agilent PLgel MiniMIX-B column 250 mm long and 4.6 mm in diameter.

The detection system is comprised of a Waters 2414 RI refractive index detector. The columns are kept at a temperature of 35° C. and the refractometer is brought to a temperature of 35° C.

The chromatography instrument is calibrated using polymethyl methacrylate standards certified by the Agilent supplier (Easi Vial PMMA).

The thickening composition obtained by the method according to the invention comprises at least one hydrophilic polymer (P) prepared by reactive extrusion according to the method according to the invention. Due to its hydrophilic advantageously water-soluble, nature, the polymer (P) can be formulated in an aqueous medium.

According to the invention, at the extruder outlet, the polymer (P) is mixed into at least one solvent.

The composition according to the invention can be aqueous or organic. In particular, the solvent may be chosen among a water-based solvent, water, and combinations thereof. The solvent is preferably water or an organic solvent-water mixture.

In step b), an additive other than the solvent may also be added. According to the invention, the thickening composition also advantageously comprises at least one additive, in particular an additive chosen among:

- an amphiphilic compound, in particular a surfactant compound, preferably a hydroxylated surfactant compound, for example alkyl-polyalkylene glycol, in particular alkyl-polyethylene glycol and alkyl-polypropylene glycol;
- a polysaccharide derivative, for example cyclodextrin, cyclodextrin derivative, polyethers;
- a hydrotropic compound, for example glycol, butyl glycol, butyl diglycol, monopropylene glycol, ethylene glycol, ethylene diglycol, Dowanol products (CAS number 34590-94-8), Texanol products (CAS number 25265-77-4);
- an antifoaming agent, a biocide;
- and combinations thereof.

The invention also provides a formulation that can be used in many technical fields. The formulation according to the invention comprises at least one thickening composition obtained by the method according to the invention and may comprise at least one organic or mineral pigment or organic, organo-metallic or mineral particles, for example calcium carbonate, talc, kaolin, mica, silicates, silica, metal oxides, in particular titanium dioxide, iron oxides.

The formulation according to the invention may also comprise at least one agent chosen among a particle-spacer agent, a dispersing agent, a stabilising steric agent, an electrostatic stabiliser, an opacifying agent, a solvent, a coalescent agent, an anti-foaming agent, a preservative agent, a biocide, a spreading agent, a thickening agent, a film-forming copolymer and mixtures thereof.

Depending on the particular polymer (P) or the additives that it comprises, the formulation according to the invention can be used in many technical fields. Thus, the formulation according to the invention can be a coating formulation. Preferably, the formulation according to the invention is an ink formulation, an adhesive formulation, a varnish formulation, a paint formulation, for example a decorative paint or an industrial paint.

The invention also provides a concentrated, water-based pigment paste comprising at least one thickening composition obtained using the method according to the invention and at least one coloured organic or mineral pigment.

The thickening composition obtained using the method according to the invention has properties that make it possible to use it to modify or control the rheology of the medium comprising it. Thus, the invention also provides a method for controlling the viscosity of a water-based composition.

This method of controlling viscosity according to the invention comprises the addition of at least one thickening composition, obtained using the method according to the invention, into a water-based composition.

The following examples illustrate the various aspects of the invention.

For the examples according to the invention, a co-rotating twin-screw TSA extruder is used, the geometric parameters of which are: Diameter=26 mm and length/diameter ratio=80, equipped with a gas supply device (for example nitrogen or depleted air) and a gas evacuation system. Tests are carried out under an uncontrolled atmosphere. Tests are carried out at atmospheric pressure.

The twin-screw extruder has 16 areas with separate temperature control. They can be heated electrically and cooled by water circulation. Area 1 is located under the hopper; area 16 corresponds to the die. The other areas are numbered 2, 3, 4, 5, 6, 7, 8, 9, 10, 11, 12, 13, 14, 15, in this order between area 1 and area 16. Each area has a length equal to 5 screw elements.

The reagents can be stored in heated, stirred, inerted tanks equipped with pumps enabling direct injection of the reagents into the extruder.

The flow rates of each pump can be controlled independently in order to control the ratios between the different reagents as well as the overall flow rate. It is thus possible to adjust the residence time in the extruder. The residence time can be measured by adding a coloured tracer.

The viscosity of the unformulated polyurethane is measured using a weight-based extrusion plastometer with a die 8 mm long for an inner diameter of 2.096 mm. A 2.16 kg piston is placed on the sample to be measured melted to 100±1 and the time required for a quantity of said sample to flow out of the die makes it possible to determine the MVR (melt volume rate) expressed in $cm^3/10$ min.

EXAMPLE 1

Test 1

This example illustrates the production of an HEUR by addition of polyethylene glycol (PEG), of ethoxylated cardanol (CASnumber: 37330-39-5) with isophorone diisocyanate (IPDI) in the presence of a catalyst.

The polyethylene glycol used comprises approximately 230 repeating units, the length of the ethoxylate chain of the cardanol is approximately 4 units of ethylene oxide, and the catalyst used is dibutyltin dilaurate (DBTDL).

The PEG/ethoxylated cardanol/DBTDL mixture is placed in a sealed tank heated to 90° C. under vacuum and dehydrated until a water content of less than 800 ppm is obtained. This tank is then inerted with nitrogen.

The IPDI is placed in a sealed tank heated to 60° C. and inerted with nitrogen.

In this example, area 1 is heated to 25° C. The other 15 areas are heated to 120° C.

The residence time of the reaction medium in the extruder is between 8 and 10 minutes for a flow rate of 3.05 kg/h (IPDI 0.18 kg/h; PEG 2.6 kg/h; ethoxylated cardanol 0.27 kg/h).

The product obtained at the extruder outlet is in the form of a molten resin. It is formulated directly at the outlet of the die in a water/cosolvent mixture (OXO C10 alcohol ethoxylates—Surfaline Ox1008 from Arkema) such that the final formulation contains 30% by weight of polyurethane base, 20% by weight of cosolvent and 50% by weight of water. A portion of the unformulated resin is preserved in order to measure the MVR (melt volume rate).

MVR (100° C./216 kg)=45 $cm^3/10$ min.

Test 2

This example illustrates the production of an HEUR by addition of polyethylene glycol, of ethoxylated cardanol with IPDI in the presence of a catalyst.

The polyethylene glycol used comprises approximately 230 repeating units, the length of the ethoxylate chain of the cardanol is approximately 4 units of ethylene oxide and the catalyst used is dibutyltin dilaurate.

The PEG/ethoxylated cardanol/DBTDL mixture is placed in a sealed tank heated to 90° C. under vacuum and dehydrated until a water content of less than 800 ppm is obtained. This tank is then inerted with nitrogen.

The IPDI is placed in a sealed tank heated to 60° C. and inerted with nitrogen.

In this example, area 1 is heated to 25° C. The other 15 areas are heated to 120° C.

The residence time of the reaction medium in the extruder is between 5 and 7 minutes for a flow rate of 4.58 kg/h (IPDI 0.27 kg/h; PEG 3.9 kg/h; ethoxylated cardanol 0.41 kg/h).

The product obtained at the extruder outlet is in the form of a molten resin. It is formulated directly at the outlet of the die in a water/cosolvent mixture (Surfaline Ox1008 from Arkema) such that the final formulation contains 30% by weight of polyurethane base, 20% by weight of cosolvent and 50% by weight of water. A portion of the unformulated resin is preserved in order to measure the MVR (melt volume rate).

MVR (100° C./2.16 kg)=62 $cm^3/10$ min.

Test 3

This example illustrates the production of an HEUR by addition of polyethylene glycol, of ethoxylated cardanol with IPDI in the presence of a catalyst.

The polyethylene glycol used comprises approximately 230 repeating units, the length of the ethoxylate chain of the cardanol is approximately 4 units of ethylene oxide and the catalyst used is dibutyltin dilaurate.

The PEG/ethoxylated cardanol/DBTDL mixture is placed in a sealed tank heated to 90° C. under vacuum and dehydrated until a water content of less than 800 ppm is obtained. This tank is then inerted with nitrogen.

The IPDI is placed in a sealed tank heated to 60° C. and inerted with nitrogen.

In this example, area 1 is heated to 25° C. The other 15 areas are heated to 120° C.

The residence time of the reaction medium in the extruder is between 11 and 14 minutes for a flow rate of 2.29 kg/h (IPDI 0.14 kg/h; PEG 1.95 kg/h; ethoxylated cardanol 0.20 kg/h).

The product obtained at the extruder outlet is in the form of a molten resin. It is formulated directly at the outlet of the die in a water/cosolvent mixture (Surfaline Ox1008 from Arkema) such that the final formulation contains 30% by weight of polyurethane base, 20% by weight of cosolvent and 50% by weight of water. A portion of the unformulated resin is preserved in order to measure the MVR (melt volume rate).

MVR (100° C./2.16 kg)=21 cm$^3$/10 min.

Test 4

This example illustrates the production of an HEUR by addition of polyethylene glycol, of ethoxylated cardanol with toluene diisocyanate (TDI 80/20) in the presence of a catalyst.

The polyethylene glycol used comprises approximately 230 repeating units, the length of the ethoxylate chain of the cardanol is approximately 4 units of ethylene oxide and the catalyst used is dibutyltin dilaurate.

The PEG/ethoxylated cardanol/DBTDL mixture is placed in a sealed tank heated to 90° C. under vacuum and dehydrated until a water content of less than 800 ppm is obtained. This tank is then inerted with nitrogen.

The TDI is placed in a sealed tank heated to 60° C. and inerted with nitrogen. In this example, area 1 is heated to 25° C. The other 15 areas are heated to 120° C.

The residence time of the reaction medium in the extruder is between 8 and 10 minutes for a flow rate of 4.52 kg/h (TDI 0.22 kg/h; PEG 3.90 kg/h; ethoxylated cardanol 0.40 kg/h).

The product obtained at the extruder outlet is in the form of a molten resin. It is formulated directly at the outlet of the die in a water/cosolvent mixture (Surfaline Ox1008 from Arkema) such that the final formulation contains 30% by weight of polyurethane base, 20% by weight of cosolvent and 50% by weight of water. A portion of the unformulated resin is preserved in order to measure the MVR (melt volume rate).

MVR (100° C./2.16 kg)=13 cm$^3$/10 min.

Test 5

This example illustrates the production of an HEUR by addition of polyethylene glycol, of ethoxylated cardanol with H12MDI in the presence of a catalyst.

The polyethylene glycol used comprises approximately 230 repeating units, the length of the ethoxylate chain of the cardanol is approximately 4 units of ethylene oxide and the catalyst used is dibutyltin dilaurate.

The PEG/ethoxylated cardanol/DBTDL mixture is placed in a sealed tank heated to 90° C. under vacuum and dehydrated until a water content of less than 800 ppm is obtained. This tank is then inerted with nitrogen.

The H12MDI is placed in a sealed tank heated to 60° C. and inerted with nitrogen.

In this example, area 1 is heated to 25° C. The other 15 areas are heated to 120° C.

The residence time of the reaction medium in the extruder is between 11 and 14 minutes for a flow rate of 2.31 kg/h (H12MDI 0.16 kg/h; PEG 1.95 kg/h; ethoxylated cardanol 0.20 kg/h).

The product obtained at the extruder outlet is in the form of a molten resin. It is formulated directly at the outlet of the die in a water/cosolvent mixture (Surfaline Ox1008 from Arkema) such that the final formulation contains 30% by weight of polyurethane base, 20% by weight of cosolvent and 50% by weight of water. A portion of the unformulated resin is preserved in order to measure the MVR (melt volume rate).

MVR (100° C./2.16 kg)=19 cm$^3$/10 min.

Test 6

This example illustrates the production of an HEUR by addition of polyethylene glycol, of ethoxylated cardanol with HDI in the presence of a catalyst.

The polyethylene glycol used comprises approximately 230 repeating units, the length of the ethoxylate chain of the cardanol is approximately 4 units of ethylene oxide and the catalyst used is dibutyltin dilaurate.

The PEG/ethoxylated cardanol/DBTDL mixture is placed in a sealed tank heated to 90° C. under vacuum and dehydrated until a water content of less than 800 ppm is obtained. This tank is then inerted with nitrogen.

The HDI is placed in a sealed tank heated to 60° C. and inerted with nitrogen.

In this example, area 1 is heated to 25° C. The other 15 areas are heated to 120° C.

The residence time of the reaction medium in the extruder is between 11 and 14 minutes for a flow rate of 2.25 kg/h (HDI 0.10 kg/h; PEG 1.95 kg/h; ethoxylated cardanol 0.20 kg/h).

The product obtained at the extruder outlet is in the form of a molten resin. It is formulated directly at the outlet of the die in a water/cosolvent mixture (Surfaline Ox1008 from Arkema) such that the final formulation contains 30% by weight of polyurethane base, 20% by weight of cosolvent and 50% by weight of water. A portion of the unformulated resin is preserved in order to measure the MVR (melt volume rate).

MVR (100° C./2.16 kg)=29 cm$^3$/10 min.

Test 7

This example illustrates the production of an HEUR by addition of polyethylene glycol, of ethoxylated cardanol with HDI in the presence of a catalyst.

The polyethylene glycol used comprises approximately 230 repeating units, the length of the ethoxylate chain of the cardanol is approximately 4 units of ethylene oxide and the catalyst used is dibutyltin dilaurate.

The PEG/ethoxylated cardanol/DBTDL mixture is placed in a sealed tank heated to 90° C. under vacuum and dehydrated until a water content of less than 800 ppm is obtained. This tank is then inerted with nitrogen.

The HDI is placed in a sealed tank heated to 60° C. and inerted with nitrogen.

In this example, area 1 is heated to 25° C. The other 15 areas are heated to 130° C.

The residence time of the reaction medium in the extruder is between 11 and 14 minutes for a flow rate of 2.25 kg/h (HDI 0.10 kg/h; PEG 1.95 kg/h; ethoxylated cardanol 0.20 kg/h).

The product obtained at the extruder outlet is in the form of a molten resin. It is formulated directly at the outlet of the die in a water/cosolvent mixture (Surfaline Ox1008 from Arkema) such that the final formulation contains 30% by weight of polyurethane base, 20% by weight of cosolvent and 50% by weight of water. A portion of the unformulated resin is preserved in order to measure the MVR (melt volume rate).

MVR (100° C./2.16 kg)=12 cm$^3$/10 min.

Test 8

This example illustrates the production of an HEUR by addition of polyethylene glycol, of ethoxylated cardanol with HDI in the presence of a catalyst.

The polyethylene glycol used comprises approximately 230 repeating units, the length of the ethoxylate chain of the cardanol is approximately 4 units of ethylene oxide and the catalyst used is dibutyltin dilaurate.

The PEG/ethoxylated cardanol/DBTDL mixture is placed in a sealed tank heated to 90° C. under vacuum and dehydrated until a water content of less than 800 ppm is obtained. This tank is then inerted with nitrogen.

The HDI is placed in a sealed tank heated to 60° C. and inerted with nitrogen.

In this example, area 1 is heated to 25° C. Areas 2, 3, 4 are heated to 170° C.; the other areas are heated to 120° C.

The residence time of the reaction medium in the extruder is between 11 and 14 minutes for a flow rate of 2.25 kg/h (HDI 0.10 kg/h; PEG 1.95 kg/h; ethoxylated cardanol 0.20 kg/h).

The product obtained at the extruder outlet is in the form of a molten resin. It is formulated directly at the outlet of the die in a water/cosolvent mixture (Surfaline Ox1008 from Arkema) such that the final formulation contains 30% by weight of polyurethane base, 20% by weight of cosolvent and 50% by weight of water. A portion of the unformulated resin is preserved in order to measure the MVR (melt volume rate).

MVR (100° C./2.16 kg)=9.2 cm$^3$/10 min.

Test 9

This example illustrates the production of an HEUR by addition of polyethylene glycol, of ethoxylated cardanol with HDI in the presence of a catalyst.

The polyethylene glycol used comprises approximately 230 repeating units, the length of the ethoxylate chain of the cardanol is approximately 4 units of ethylene oxide and the catalyst used is dibutyltin dilaurate.

The PEG/ethoxylated cardanol/DBTDL mixture is placed in a sealed tank heated to 90° C. under vacuum and dehydrated until a water content of less than 800 ppm is obtained. This tank is then inerted with nitrogen.

The HDI is placed in a sealed tank heated to 60° C. and inerted with nitrogen.

In this example, area 1 is heated to 25° C. Areas 2, 3, 4, 5, 6 are heated to 170° C.; the other areas are heated to 120° C.

The residence time of the reaction medium in the extruder is between 11 and 14 minutes for a flow rate of 2.25 kg/h (HDI 0.10 kg/h; PEG 1.95 kg/h; ethoxylated cardanol 0.20 kg/h).

The product obtained at the extruder outlet is in the form of a molten resin. It is formulated directly at the outlet of the die in a water/cosolvent mixture (Surfaline Ox1008 from Arkema) such that the final formulation contains 30% by weight of polyurethane base, 20% by weight of cosolvent and 50% by weight of water. A portion of the unformulated resin is preserved in order to measure the MVR (melt volume rate).

MVR (100° C./2.16 kg)=<5 cm$^3$/10 min.

Test 10

This example illustrates the production of an HEUR by addition of polyethylene glycol, of ethoxylated tristyryl phenol (TSP) with IPDI in the presence of a catalyst.

The polyethylene glycol used comprises approximately 230 repeating units, the length of the ethoxylate chain of the TSP is approximately 3 units of ethylene oxide and the catalyst used is dibutyltin dilaurate.

The PEG/ethoxylated TSP/DBTDL mixture is placed in a sealed tank heated to 90° C. under vacuum and dehydrated until a water content of less than 800 ppm is obtained.

This tank is then inerted with nitrogen.

The IPDI is placed in a sealed tank heated to 60° C. and inerted with nitrogen.

In this example, area 1 is heated to 25° C. Areas 2, 3, 4, 5, 6 are heated to 170° C.; the other areas are heated to 120° C.

The residence time of the reaction medium in the extruder is between 11 and 14 minutes for a flow rate of 2.25 kg/h (IPDI 0.10 kg/h; PEG 1.95 kg/h; ethoxylated TSP 0.20 kg/h). The product obtained at the extruder outlet is in the form of a molten resin. It is formulated directly at the outlet of the die in a water/cosolvent mixture (straight C8 ethoxylated alcohol 80E-Surfaline CC8 from Arkema) such that the final formulation contains 30% by weight of polyurethane base, 20% by weight of cosolvent and 50% by weight of water. A portion of the unformulated resin is preserved in order to measure the MVR (melt volume rate).

MVR (100° C./2.16 kg)=14 cm$^3$/10 min.

Test 11

This example illustrates the production of an HEUR by addition of polyethylene glycol, of hexan-1-ol with H12MDI in the presence of a catalyst.

The polyethylene glycol used comprises approximately 230 repeating units and the catalyst used is dibutyltin dilaurate.

The PEG is placed in a sealed tank heated to 90° C. under vacuum and dehydrated until a water content of less than 800 ppm is obtained. The hexan-1-ol and DBTDL are added, then this tank is inerted with nitrogen.

The H12MDI is placed in a sealed tank heated to 60° C. and inerted with nitrogen.

In this example, area 1 is heated to 25° C. The other areas are heated to 120° C.

The residence time of the reaction medium in the extruder is between 5 and 7 minutes for a flow rate of 4.31 kg/h (H12MDI 0.32 kg/h; PEG 3.9 kg/h; hexan-1-ol 0.09 kg/h).

The product obtained at the extruder outlet is in the form of a molten resin. It is formulated directly at the outlet of the die in water such that the final formulation contains 20% by weight of polyurethane base and 80% by weight of water. A portion of the unformulated resin is preserved in order to measure the MVR (melt volume rate).

MVR (100° C./2.16 kg)=51 cm$^3$/10 min.

Test 12

This example illustrates the production of an HEUR by addition of polyethylene glycol, of hexan-1-ol with methylene bis(4-cyclohexylisocyanate) (H12MDI) in the presence of a catalyst.

The polyethylene glycol used comprises approximately 230 repeating units and the catalyst used is 1,8-diazabicyclo (5, 4, 0) undec-7-ene (DBU).

The PEG is placed in a sealed tank heated to 90° C. under vacuum and dehydrated until a water content of less than 800 ppm is obtained. The hexan-1-ol and DBU are added, then this tank is inerted with nitrogen.

The H12MDI is placed in a sealed tank heated to 60° C. and inerted with nitrogen.

In this example, area 1 is heated to 25° C. Areas 2, 3, 4 are heated to 170° C.; the other areas are heated to 120° C.

The residence time of the reaction medium in the extruder is between 11 and 14 minutes for a flow rate of 2.16 kg/h (H12MDI 0.16 kg/h; PEG 1.95 kg/h; hexan-1-ol 0.5 kg/h).

The product obtained at the extruder outlet is in the form of a molten resin. It is formulated directly at the outlet of the die in water such that the final formulation contains 20% by weight of polyurethane base and 80% by weight of water. A portion of the unformulated resin is preserved in order to measure the MVR (melt volume rate).

MVR (100° C./2.16 kg)=16 cm$^3$/10 min.

Tests 13-a and 13-b

This example illustrates the production of an HEUR by addition of polyethylene glycol, of hexan-1-ol with H12MDI in the presence of a catalyst.

The polyethylene glycol used comprises approximately 230 repeating units, the length of the ethoxylate chain of the cardanol is approximately 4 units of ethylene oxide and the catalyst used is 1.8-diazabicyclo (5, 4, 0) undec-7-ene (DBU).

The PEG is placed in a sealed tank heated to 90° C. under vacuum and dehydrated until a water content of less than 800 ppm is obtained. The hexan-1-ol and DBU are added, then this tank is inerted with nitrogen.

The H12MDI is placed in a sealed tank heated to 60° C. and inerted with nitrogen. In this example, area 1 is heated to 25° C. Areas 2, 3, 4 are heated to 170° C.; the other areas are heated to 120° C.

The residence time of the reaction medium in the extruder is between 11 and 14 minutes for a flow rate of 2.16 kg/h (H12MDI 0.16 kg/h; PEG 1.95 kg/h; hexan-1-ol 0.05 kg/h).

The product obtained at the extruder outlet is in the form of a molten resin. It is formulated directly at the outlet of the die in water such that the final formulation contains 20% by weight of polyurethane base and 80% by weight of water. A portion of the unformulated resin is preserved in order to measure the MVR (melt volume rate).

MVR (100° C./2.16 kg)=18 cm$^3$/10 min (13-a).

The pump flow rates are then changed to increase the overall flow rate to 4.31 kg/h (H12MDI 0.32 kg/h; PEG 3.9 kg/h; hexan-1-ol 0.09 kg/h). After balancing for 15 minutes, the residence time is measured by adding a coloured tracer at about 5 to 7 minutes.

MVR (100° C./2.16 kg)=24 cm$^3$/10 min (13-b).

Test 14 (Comparison)

This test corresponds to a polyurethane resulting from the condensation, expressed in % by weight, of each of the constituents:
- 85.2% of polyethylene glycol with 230 repeating units of ethylene oxide,
- 8.9% of oxyethylated cardanol with 4 units of ethylene oxide,
- 5.9% of isophorone diisocyanate.

260 g of PEG with 230 repeating units of ethylene oxide and 27 g oxyethylated cardanol with 4 units of ethylene oxide are introduced into a 1 L glass reactor equipped with anchor-type mechanical stirring and a rotary pump to generate vacuum. This mixture is heated to 80° C. using a heating mantle. The reactor is placed under vacuum to dry the mixture. When the water content, measured with a Karl-Fischer type instrument, is less than 800 ppm, 200 ppm of DBTDL and then 18 g of IPDI are introduced. The addition reaction is allowed to continue for 1 hour.

A portion of the polyurethane obtained is formulated in water in the presence of a surfactant sold as "Surfaline Ox1008" by Arkema (weight ratio: 30% PU, 20% Surfaline Ox1008, 50% water). A sufficient amount is extracted prior to formulation in order to be able to measure the MVR.

MVR (100° C./2.16 kg)=66 cm$^3$/10 min.

Test 15 (Comparison)

This test corresponds to a polyurethane resulting from the condensation, expressed in % by weight, of each of the constituents:
- 90.5% of polyethylene glycol with 230 repeating units of ethylene oxide,
- 2.1% of hexan-1-ol,
- 7.4% of H12MDI.

195 g of PEG with 230 repeating units of ethylene oxide is introduced into a 1 L glass reactor equipped with anchor-type mechanical stirring and a rotary pump to generate vacuum. The PEG is heated to 80° C. using a heating mantle. The reactor is placed under vacuum to dry it. When the water content, measured with a Karl-Fischer type instrument, is less than 800 ppm, 4.5 g of hexan-1-ol, 200 ppm of DBTDL, then 16 g of H12MDI are introduced, in that order. The addition reaction is allowed to continue for 1 hour.

A portion of the polyurethane obtained is formulated in water (weight ratio: 20% PU, 80% water). A sufficient amount is extracted prior to formulation in order to be able to measure the MVR.

MVR (100° C./2.16 kg)=72 cm$^3$/10 min.

EXAMPLE 2

This example illustrates the use of polyurethanes according to the invention and comparative polyurethanes as thickening agents in a solvent-free matte paint.

The paint composition is detailed in Table 1, with the weights of each constituent indicated in grams. The thickeners all have a solids content of 30% by weight of active ingredient. The paint is formulated according to known methods.

TABLE 1

| Ingredients in the Water-based Paint Formulation | Quantity (g) |
| --- | --- |
| Ecodis P50 (COATEX dispersant) | 2.0 |
| Tego 1488 (TEGO Antifoam) | 0.76 |
| Mergal K6N (TROY bactericide) | 1.0 |
| TiONa RL68 (MILLENIUM TiO$_2$) | 40.98 |
| Omyacoat 850 OG (OMYA CaCO$_3$) | 66.51 |
| Durcal 5 (OMYA CaCO$_3$) | 150.02 |
| Mowilith LDM 1871 (CLARIANT binder) | 75.78 |
| NaOH | 0.82 |
| Thickening polyurethane composition | 6.18 |
| Water | 155.95 |
| Total | 500.00 |

The resulting viscosities are then determined at different shear rates:
- at low shear rate: Brookfield™ viscosity of 10 and 100 rpm, respectively denoted BV10 and BV100 (mPa·s),
- at moderate shear rate: Stormer viscosity (Krens Unit, KU),
- at high shear rate: ICI viscosity (0.1 Pa·s).

These measurements are done 24 hours after the formulation has been prepared. The formulations are temperature-controlled at 25±0.5° C.

It should be recalled that, in the field of water-based paints, high viscosity at high shear rates reflects good dynamic behaviour. In practice, the viscosity of the paint remains sufficiently high during the step of applying the paint onto the substrate. The advantages can be greater build (i.e. a thicker coat weight) and less tendency to splatter.

At the same time, high viscosity at low or moderate shear rates reflects good static behaviour. Thus, good stability is ensured during storage while avoiding the settling phenomenon and limiting the tendency to flow on vertical substrates. Examples A1 to A14 were carried out using the thickener produced during the corresponding tests 1 to 14 in Example 1.

TABLE 2

Matte Paint Formulation

| Example | Brookfield Viscosity 10 mPa · s | Brookfield Viscosity 100 mPa · s | Stormer Viscosity KU | ICI Viscosity 0.1 Pa · s |
|---|---|---|---|---|
| A1 | 18,050 | 4,410 | 116 | 0.7 |
| A2 | 17,200 | 4,220 | 114 | 0.65 |
| A3 | 21,500 | 5,350 | 121 | 0.8 |
| A4 | 28,600 | 7,880 | 137 | 0.8 |
| A5 | 22,900 | 5,860 | 126 | 0.7 |
| A6 | 21,100 | 5,400 | 122 | 0.65 |
| A7 | 28,900 | 7,810 | 139 | 0.75 |
| A8 | 29,700 | 8,020 | >141 | 0.85 |
| A9 | 30,850 | 8,100 | >141 | 0.8 |
| A14 | 17,500 | 4,320 | 116 | 0.7 |

These results demonstrate that the polyurethane compositions according to the invention make it possible to effectively thicken a solvent-free matte paint, regardless of the shear rate. In addition, the polyurethanes according to tests A4, A5, A7, A8, A9 offer performances that are higher than those of the reference A14.

The viscosities obtained at high shear gradients are preserved, the viscosities measured at moderate and low shear rates are substantially improved. The efficacy of these polyurethanes as pseudoplastic additives is greater.

EXAMPLE 3

This example illustrates the use of polyurethanes according to the invention and comparative polyurethanes as thickening agents in a thickening latex formula.

The composition of the formulation is detailed in Table 3, with the weights of each constituent indicated in grams.

The thickeners all have a solids content of 20% by weight of active ingredient. Formulation is carried out according to the methods known to the person skilled in the art.

TABLE 3

| Binder Formulation Ingredients | Quantity (g) |
|---|---|
| Encor 662 (Arkema Coating Resins) | 161.0 |
| 28% ammonia in water | Qsp pH = 8.5 |
| Polyurethane tested as is | 24 |
| Water | 45 |

The resulting viscosities are then determined at different shear rates:
- at low shear rate: Brookfield™ viscosity at 10 rpm, respectively denoted VB10 (in mPa·s),
- at moderate shear rate: Stormer viscosity (Krens Unit, KU),
- at high shear rate: ICI viscosity (0.1 Pa·s).

These measurements are done 1 hour after the formulation has been prepared. The formulations are temperature-controlled at 25±0.5° C.

TABLE 4

Thickening Latex Formulation

| Example | Brookfield Viscosity 10 mPa · s | Stormer Viscosity KU | ICI Viscosity 0.1 Pa · s |
|---|---|---|---|
| A11 | 730 | 77 | 1.8 |
| A12 | 3,350 | 105 | 3.1 |
| A13-a | 2,400 | 96 | 2.8 |
| A13-b | 1,470 | 91 | 2.6 |
| A15 | 680 | 74 | 1.6 |

These results demonstrate that the polyurethanes according to the invention effectively thicken a water/latex mixture neutralised to pH=8.5, regardless of the shear rate. In addition, the polyurethanes according to tests A11, A12, A13-a, A13-B offer performances that are higher than those of the reference A15.

The viscosities obtained at high and low shear gradients are significantly higher; the viscosities measured at moderate shear rate are substantially improved. The effectiveness of these polyurethanes as Newtonian additives is better.

The invention claimed is:

1. A method for preparing a thickening composition, the method comprising:
   continuously preparing a hydrophilic polymer (P), having a Mw in a range of from 60,000 to 500,000 g/mol, by a reactive extrusion of precursors comprising a water-soluble polyalkylene glycol (A), in at least 69.44 wt. % 80-wt. %, and a product (B), in a range of from 9.513 to 30.56 wt. %, relative to a total weight of the precursors; and
   mixing the hydrophilic polymer (P) in a medium comprising a solvent,
   wherein the water-soluble polyalkylene glycol (A) comprises a polyethylene glycol, a polyethylene glycol-polypropylene glycol copolymer comprising at most 40% by weight of polypropylene glycol, and/or a polyethylene glycol-polybutylene glycol copolymer comprising at most 20% by weight of polybutylene glycol,
   wherein the water-soluble polyalkylene glycol (A) has a weight-average molecular mass (Mw) in a range of from 1,000 to 40,000 g/mol,
   wherein the product (B) comprises an associative group and a monoisocyanate group,
   wherein the product (B) comprises:
   (b) a combination of a diisocyanate (B3) and a compound (B2) of formula (II):

   $$R'\text{-}(EO)_n\text{---}(PO)_m\text{---}(BO)_p\text{---}X \qquad (II),$$

R' being a straight, branched, or cyclic, saturated, unsaturated, or aromatic hydrocarbon group comprising from 6 to 40 carbon atoms, (EO) being an ethoxylene group, (PO) being a propoxylene group, (BO) being a butoxylene group, n, m, and p independently being a real number in a range of from 0 to 150, a sum of n, m, and p being a real number in a range of from 1 to 150, and X being a chemical group carrying a labile hydrogen suitable to react with an isocyanate group to form the monoisocyanate in the reactive extrusion; and/or
   (c) a product resulting from a prior condensation of the diisocyanate (B3) and the compound (B2) of formula (II).

2. The method of claim 1, wherein the reactive extrusion is conducted in an extruder having a length/diameter ratio of greater than or equal to 20.

3. The method of claim 1, wherein the product (B) comprises the combination (b), and
wherein X in the compound (B2) is an alcohol group.

4. The method of claim 1,
wherein the diisocyanate (B3) comprises 1,4-butane diisocyanate, hexamethylene diisocyanate, pentamethylene diisocyanate, isophorone diisocyanate, 1,3- and 1,4-cyclohexane diisocyanate, methylene bis(4-cyclohexylisocyanate), 2,6-toluene diisocyanate, 2,4-toluene diisocyanate, 2,2'-diphenylmethylene diisocyanate, 4,4'-diphenylmethylene diisocyanate, 2,4'-diphenylmethylene diisocyanate, 4,4'-dibenzyl diisocyanate, 2,4'-dibenzyl diisocyanate, m-xylylene diisocyanate, 1-methyl-2,4-diisocyanatocyclohexane, a combination of 1-methyl-2,4-diisocyanatocyclohexane with 1-methyl-2,6-diisocyanatocyclohexane, tetramethylxylene diisocyanate (TMXDI), and/or hexane trimethyl-1,6-diisocyanate.

5. The method of claim 1, wherein the precursors in the reactive extrusion further comprise a cross-linking compound (C) in a range of from greater than 0 to 10 wt. %.

6. The method of claim 1, wherein the reactive extrusion is carried out in the presence of a catalyst.

7. The method of claim 1, wherein the product (B) is present in the precursors in a range of from 13.333 to 30.56 wt. %.

8. The method of claim 1, wherein the solvent comprises water and/or an organic solvent.

9. The method of claim 1, wherein the mixing comprises mixing the hydrophilic polymer (P) in the medium, the medium further comprising an amphiphilic compound, a polysaccharide derivative, a hydrotropic compound, an antifoaming agent, and/or a biocide agent.

10. The method of claim 1, wherein the hydrophilic polymer (P) has a Mw in a range of from more than 150,000 to 500,000 g/mol, and
wherein the water-soluble polyalkylene glycol (A) has a weight-average molecular mass (Mw) in a range of from 3,000 to 20,000 g/mol.

11. The method of claim 1, wherein the water-soluble polyalkylene glycol (A) has a weight-average molecular mass (Mw) in a range of from 4,000 to 15,000 g/mol.

12. The method of claim 1, wherein the product (B) comprises the combination (b), and
wherein X in the compound (B2) is an amine group.

13. The method of claim 1, wherein the precursors in the reactive extrusion further comprise a polyol, polyamine, and/or a polyisocyanate comprising more than two isocyanate groups.

14. The method of claim 6, wherein the catalyst comprises acetic acid.

15. The method of claim 6, wherein the catalyst comprises an amine.

16. The method of claim 6, wherein the catalyst comprises Al, Bi, Sn, Hg, Pb, Mn, Zn, Zr, and/or Ti.

17. The method of claim 1, wherein the solvent comprises water.

18. The method of claim 1, wherein the solvent is mainly water.

19. A method for preparing a thickening composition, the method comprising:
continuously preparing a hydrophilic polymer (P), having a Mw in a range of from 60,000 to 500,000 g/mol, by a reactive extrusion of precursors comprising a water-soluble polyalkylene glycol (A), in at least 69.44 wt. %, and a product (B), in a range of from 9.513 to 30.56 wt. %, relative to a total weight of the precursors; and
mixing the hydrophilic polymer (P) in a medium comprising a solvent,
wherein the water-soluble polyalkylene glycol (A) comprises a polyethylene glycol, a polyethylene glycol-polypropylene glycol copolymer comprising at most 40% by weight of polypropylene glycol, and/or a polyethylene glycol-polybutylene glycol copolymer comprising at most 20% by weight of polybutylene glycol,
wherein the water-soluble polyalkylene glycol (A) has a weight-average molecular mass (Mw) in a range of from 1,000 to 40,000 g/mol,
wherein the product (B) comprises an associative group and a monoisocyanate group,
wherein the product (B) comprises:
(b) a combination of a diisocyanate (B3) and a compound (B2) of formula (II):

R' being a straight, branched, or cyclic, saturated, unsaturated, or aromatic hydrocarbon group comprising from 6 to 40 carbon atoms, (EO) being an ethoxylene group, (PO) being a propoxylene group, (BO) being a butoxylene group, n, m, and p independently being a real number in a range of from 0 to 150, a sum of n, m, and p being a real number in a range of from 0 to 150, and X being an amine group; and/or
(c) a product resulting from a prior condensation of the diisocyanate (B3) and the compound (B2) of formula (II).

20. A method for preparing a thickening composition, the method comprising:
continuously preparing a hydrophilic polymer (P), having a Mw in a range of from 60,000 to 500,000 g/mol, by a reactive extrusion of precursors comprising a water-soluble polyalkylene glycol (A), in at least 55 wt. %, and a product (B), in a range of from 9.513 to 45 wt. %, relative to a total weight of the precursors; and
mixing the hydrophilic polymer (P) in a medium comprising a solvent and further comprising,
wherein the water-soluble polyalkylene glycol (A) comprises a polyethylene glycol, a polyethylene glycol-polypropylene glycol copolymer comprising at most 40% by weight of polypropylene glycol, and/or a polyethylene glycol-polybutylene glycol copolymer comprising at most 20% by weight of polybutylene glycol,
wherein the water-soluble polyalkylene glycol (A) comprises a polyethylene glycol,
wherein the water-soluble polyalkylene glycol (A) has a weight-average molecular mass (Mw) in a range of from 1,000 to 40,000 g/mol,
wherein the product (B) comprises an associative group and a monoisocyanate group,
wherein the product (B) comprises:
(b) a combination of a diisocyanate (B3) and a compound (B2) of formula (II):

R" being a hydrocarbon group of formula $C_{15}H_{31-x}$ where x is 0, 2, 4, or 6, (EO) being an ethoxylene group, (PO) being a propoxylene group, n, m, and p independently being a real number in a range of from 0 to 150, a sum of n, m, and p being a real number in a range of from 4 to 150, and X being a chemical group carrying a labile hydrogen suitable to react with an isocyanate group to form the monoisocyanate in the reactive extrusion; and/or (c) a product resulting from a prior condensation of the diisocyanate (B3) and the compound (B2) of formula (II).

* * * * *